A. M. & J. I. D. Bristol,
Dish Cleaner,

Nº 40,457. Patented Nov. 3, 1863.

Witnesses:

Inventors:

UNITED STATES PATENT OFFICE.

ALEX. M. BRISTOL AND JNO. I. D. BRISTOL, OF DETROIT, MICHIGAN.

IMPROVED DISH-WASHING MACHINE.

Specification forming part of Letters Patent No. 40,457, dated November 3, 1863.

*To all whom it may concern:*

Be it known that we, A. M. BRISTOL and JOHN I. D. BRISTOL, of Detroit, in the county of Wayne and State of Michigan, have invented a new and useful Machine for Washing Dishes; and we do hereby declare that the following is a full, clear, and exact description of the same, reference being had to the accompanying drawings, making a part of this specification, in which—

Figure 1:
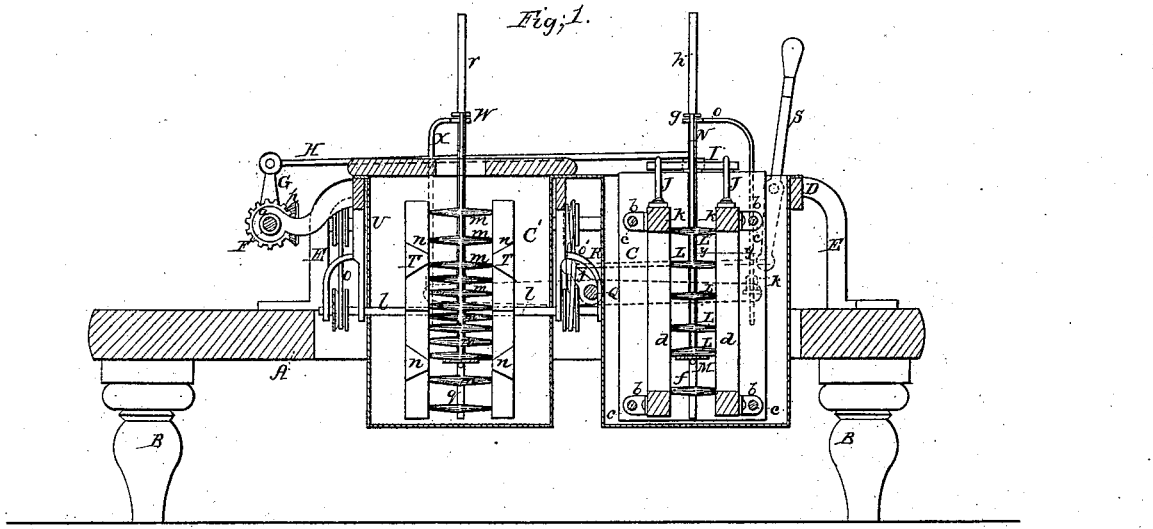
Figure 2:
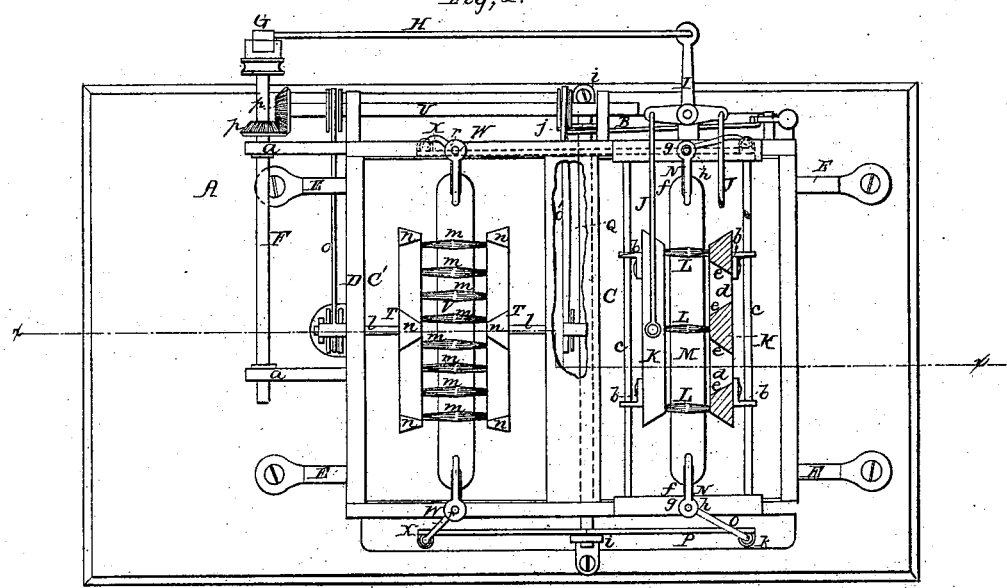

Figure 1 is a side sectional view of our invention, taken in the line $x\,x$, Fig. 2; Fig. 2, a plan or top view of the same, partly in section, as indicated by the line $y\,y$, Fig. 1.

This invention consists in the employment or use of reciprocating brush-plates and rotary brush-disks placed within suitable boxes and arranged to operate in such a manner as to perform the work of washing dishes—such as plates and similar flat dishes—with great rapidity and in a thorough and efficient manner.

To enable others skilled in the art to fully understand and construct our invention, we will proceed to describe it.

A represents a platform, which is supported at a suitable height on pedestals B, and C C' are two boxes or reservoirs, which may be constructed of sheet metal or wood. These boxes are fitted in a rectangular frame, D, which is secured to the upper ends of brackets E attached to the platform A, the boxes C C' extending down through an opening in the platform, as shown cleary in Fig. 1.

F represents a driving-shaft, the bearings $a$ of which are attached to the frame D. This shaft F has a crank, G, at one end of it, to which one end of a rod, H, is connected, the opposite end of said rod being attached to a T-shaped lever, I, at one end of the upper part of the box C.

To the lever I there are connected two rods, J J, which are attached each to a plate, K. These plates are of rectangular form, and have eyes $b$ at their outer surfaces, which are fitted loosely on horizontal guide-rods $a$ in the box C. The plates K K have a vertical position in the box C, and at their inner sides there are brushes L, any proper number being used. The plates K also have openings $d$ made in them, the sides of which are of beveled form, as shown at $e$ in Fig. 2, the inner orifices of the openings being wider than their outer orifices.

The outer ends of the brushes L of the two plates K K are nearly or quite in contact with each other, as shown in both figures.

M is a horizontal plate, the ends of which are fitted on vertical guides $f\,f$ in the box C, one near each end. This plate M is fitted between the brushes of the two plates K K, and it has a rod, N, attached to each end of it, the upper ends of said rods being bent to form eyes $g$, which are fitted on vertical guide-rods $h$, attached one to each end of the box C. On these guide-rods $h$ the upper ends of rods O are fitted—one on each—the lower ends of said rods extending down and passing through the ends of levers P, one at each side of the boxes C C'. These levers P P are fitted on a shaft, Q, which is between the two boxes C C', and has its bearings $i$ attached to the platform A.

To the shaft Q there is attached a small arm, $j$, which is connected by a rod, R, with a lever, S, and on each rod O, above the levers P, there is a stop, $k$.

In the box C' there are two rotary brush disks or wheels, T T, which are placed on separate horizontal shafts $l\,l$, the ends of the latter passing through the sides of the box C'. These brush disks or wheels are constructed in pointed form, and are provided with brushes $m$. The sides of the points or arms, which are designated by $n$, have beveled sides, so as to leave the spaces between them at their inner surfaces wider than at their outer surfaces, as shown clearly in both figures. The brush disks or wheels T T are rotated by bolts $o\,o'$ ($o'$ being a cross-belt) from a shaft, U, which receives its motion through the medium of bevel-gears $p$ from the driving-shaft F, and the shaft U is allowed to slide longitudinally in its bearings, so that the gears $p$ may be thrown in and out of gear with each other when necessary.

Between the two brush disks or wheels T T there is placed a horizontal plate, V, the ends of which are fitted on vertical guides $q$ in the box C', and said plate V has a rod, W, connected to each end of it, the rods W extending upward and fitted on vertical guides $r$, at each end of the box C'. On the guides $r$ the upper ends of rods X are fitted, said rods extending downward and passing through the levers P P at the ends opposite to those through which the rods O pass. This arrangement of the plate V is, it will be seen, precisely similar to that of the plate M.

The operation is as follows: The boxes C C' are supplied with a requisite quantity of water, and the shaft F is rotated by any convenient power. The plates or dishes to be washed are first placed, one at a time, between the reciprocating brush-plates K K, and rest upon the plate M, which is forced down by the operator in pressing down the plate or dish. The brushes L wash the dish, scouring it thoroughly, and the openings $d$, owing to their sides being of beveled form, have a tendency to throw the water upon the disk or plate, thereby insuring a thorough cleansing operation. The openings in the brushes are designed not only as a help for washing the plate, but also to prevent grease and other substances from adhering to the hair of the brush (the current of water is forced in upon not only the plate, but directly upon the hair of the brush) when the plate or dish is thus washed. The plate M is forced upward by actuating the lever S, and the dish removed from between the brush-plates K K and inserted between the rotary brush disks or wheels T T, which rinses them thoroughly, the beveled edges or sides of the points or arms $n$ having a tendency to throw the water in contact with the dish and hair of the brush the same as in the reciprocating brushes. The arrangement is extremely simple and efficient.

We would remark that the driving-shaft U may be provided with a fly-wheel, if desired. The brushes of the plates K and disks or wheels T may be constructed and arranged in any proper or desirable way. The boxes C C' may be provided with covers having slots made in them to admit of the dishes being inserted between the brush-plates and brush disks or wheels.

Having thus described our invention, what we claim as new, and desire to secure by Letters Patent, is—

1. The reciprocating plates K K, arranged, substantially as shown, within a suitable box or reservoir, C, and provided with brushes L, substantially as and for the purpose herein set forth.

2. Providing the brush-plates K K with openings $d$, having beveled edges $e$, substantially as shown, for the purpose of throwing the water upon the dish by the action of the plates, as specified, and freeing the hair of the brushes from grease.

3. The rotary brush disks or wheels T T, arranged, as shown, within the box C', and provided with points or arms $n$, having beveled edges to operate, as and for the purpose set forth.

4. The plates M V, placed respectively between the brush-plates K K and brush disks or wheels T T, and connected, substantially as shown, with the levers P P, for the purpose herein described.

ALEX. M. BRISTOL.
JNO. I. D. BRISTOL.

Witnesses:
D. M. FREEMAN,
EUGENE FECHT.